United States Patent [19]

Nguyen et al.

[11] Patent Number: 5,009,837
[45] Date of Patent: Apr. 23, 1991

[54] AXIALLY MODULAR FUEL ASSEMBLY AND ROD FOR OPTIMAL FUEL UTILIZATION

[75] Inventors: Tho Q. Nguyen, Penn Township, Westmoreland County; Alberto L. Casadei, Monroeville, both of Pa.

[73] Assignee: Westinghouse Electric Corp., Pittsburgh, Pa.

[21] Appl. No.: 431,355

[22] Filed: Nov. 3, 1989

[51] Int. Cl.[5] ............................................. G21C 3/32
[52] U.S. Cl. .................................... 376/261; 376/433; 376/446; 376/451
[58] Field of Search ................ 376/261, 433, 446, 451

[56] References Cited

U.S. PATENT DOCUMENTS

| | | | |
|---|---|---|---|
| 3,087,882 | 4/1963 | Martin | 376/433 |
| 3,147,191 | 9/1964 | Crowther | 376/172 |
| 3,274,071 | 9/1966 | Janusz | 376/433 |
| 3,287,230 | 11/1966 | Jerking | 376/433 |
| 3,425,908 | 2/1969 | Rouge et al. | 376/440 |
| 3,674,636 | 7/1972 | Jones | 376/433 |
| 4,326,922 | 4/1982 | Ferrari et al. | 376/435 |
| 4,483,818 | 11/1984 | Yamashita et al. | 376/435 |
| 4,493,814 | 1/1985 | Beard, Jr. et al. | 376/428 |
| 4,631,166 | 12/1986 | Camden, Jr. | 376/435 |
| 4,716,015 | 12/1987 | Carlson | 376/445 |
| 4,793,963 | 12/1988 | Demario | 376/267 |

FOREIGN PATENT DOCUMENTS

| | | | |
|---|---|---|---|
| 877703 | 9/1961 | United Kingdom | 376/433 |
| 923633 | 4/1963 | United Kingdom | |

OTHER PUBLICATIONS

Newmann, L. W., et al., "Axial Blanket Fuel Design and Demonstration", Seventh Progress Report, Apr. 1985–Mar. 1986, Energy: vol. 87, No. 17, p. 26, Apr. 1987.

Primary Examiner—Brooks H. Hunt
Assistant Examiner—Meena Chelliah
Attorney, Agent, or Firm—Z. L. Dermer

[57] ABSTRACT

A modular fuel assembly has a plurality of axially stacked subassemblies. The stacked subassemblies includes upper and lower subassemblies which incorporate top and bottom nozzles, and a plurality of intermediate subassemblies disposed between the upper and lower subassemblies. Each subassembly includes a plurality of elongated guide thimble segments, a plurality of fuel rod segments and a pair of support grids mounted to the guide thimble segments and supporting the fuel rod segments. The guide thimble segments of the upper and lower subassemblies are releasably mounted to the respective top and bottom nozzles thereof. The guide thimble segments are interlocked together to form a plurality of elongated guide thimbles extending between and together with the top and bottom nozzles defining a structural skeleton of the modular fuel assembly with the support grids of the respective subassemblies disposed in axially spaced relation relative to one another along the guide thimbles and the fuel rod segments of the respective adjacent subassemblies disposed in axially aligned end-to-end interfitted relation with each other to form a plurality of elongated fuel rods of the modular fuel assembly.

24 Claims, 4 Drawing Sheets

AXIALLY MODULAR FUEL ASSEMBLY AND ROD FOR OPTIMAL FUEL UTILIZATION

BACKGROUND OF THE INVENTION

1. Field of the Invention

The present invention relates generally to nuclear fuel assemblies and, more particularly, is concerned with an axially modular fuel assembly and rod for more optimal fuel utilization.

2. Description of the Prior Art

One typical prior art nuclear fuel assembly is formed from a plurality of fuel rods supported in a skeletal assembly composed of top and bottom nozzles, a plurality of guide thimbles and an instrumentation tube extending longitudinally between and connected at their opposite ends to the top and bottom nozzles. A plurality of grids are axially spaced along and mounted to the guide thimbles and instrumentation tube for laterally supporting the fuel rods.

Each fuel rod typically includes an elongated hollow cladding tube and a plurality of uranium dioxide fuel pellets contained in a stack within the tube with the tube sealed at its opposite ends by end plugs Each fuel rod is supported at each grid by a combination of support dimples and springs on the grid. The grids are axially spaced along the guide thimbles and are captured by bulge joints formed in the guide thimbles at the grid locations in order to create an integrated skeletal structure in which the fuel rods can be inserted. The bottom nozzle serves as a lower support structural element for the fuel assembly and directs coolant flow distribution to and through the fuel assembly. The top nozzle functions as the upper structural element of the fuel assembly. The guide thimbles are structural members which also provide channels for guidance of control rods into some of the fuel assemblies.

A conventional nuclear reactor core includes a plurality of the prior art fuel assemblies disposed in a side-by-side array. In such reactor core, the benefits of an extended core life are not fully attained because of incomplete fuel consumption in the axial and radial directions during the life of the core. The incomplete consumption of fuel is most prevalent at the top and the bottom of the core. One approach to alleviation of poor fuel utilization is to employ natural uranium or, seed blankets, at the top and bottom of the core. U.S. Pat. No. 4,493,814 to Beard, Jr. et al and U.S. Pat. No. 4,631,166 to Camden, Jr., both assigned to the assignee of the present invention, relate to this approach.

Another approach is to provide a radially modular fuel assembly composed of a plurality of subassembly fuel modules. U.S. Pat. No. 4,716,015 to Carlson, assigned to the assignee of the present invention, relates to this approach. Each subassembly fuel module includes bottom and top nozzle module sections and grid sections with guide tube thimbles and fuel rods extending between the top and bottom nozzle module sections. Fuel assemblies can be reconstituted using subassembly fuel modules from different fuel assemblies or using one or more new subassembly fuel modules Each of the above-mentioned approaches fosters some improvement in fuel utilization. However, it is perceived by the inventors herein that optimal fuel utilization has not yet been attained.

SUMMARY OF THE INVENTION

The present invention provides a modular fuel assembly and fuel rod for more optimal fuel utilization. The concept of the modular fuel assembly of the present invention is to provide the fuel assembly in multiple axial fuel subassemblies which can be removed and reassembled at the site. The new reassembled fuel assembly can be made up of upper and lower axial fuel subassemblies of the old fuel assembly which have about 10 to 12 percent higher reactivity than the middle fuel subassemblies of the old fuel assembly. Likewise, the modular fuel rod is made up of multiple axial fuel rod segments.

Accordingly, the present invention is directed to a modular fuel assembly which comprises: (a) a plurality of axially stacked subassemblies; (b) each of the subassemblies including a plurality of elongated structural segments, a plurality of fuel rod segments and at least one support grid mounted to the structural segments and supporting the fuel rod segments; and (c) means for releasably connecting the structural segments together to form a plurality of elongated structural support members for providing a structural skeleton of the modular fuel assembly with the support grids of the respective subassemblies disposed in axially spaced relation relative to one another along the structural support members and the fuel rod segments of the respective adjacent subassemblies disposed in axially aligned end-to-end relation with each other. The invention further comprises means for releasably joining the fuel rod segments together to form a plurality of elongated fuel rods of the modular fuel assembly.

More particularly, the upper and lower ones of the subassemblies include top and bottom nozzles, and a plurality of intermediate ones of the subassemblies are disposed between the upper and lower subassemblies. The intermediate subassemblies are preferably at least three in number. The structural segments of the upper and lower subassemblies are releasably mounted to the respective top and bottom nozzles thereof.

Also, the present invention is directed to a modular fuel rod, comprising: (a) a plurality of axially aligned fuel rod segments; and (b) means for releasably joining the fuel segments together in axially aligned end-to-end relation with each other. Each of the fuel rod segments includes a tube segment, a pair of end plugs sealing opposite ends of the tube segment, and a stack of fuel pellets contained within the sealed tube segment. The joining means includes a plurality of first and second elements defined on respective adjacent end plugs of the fuel rod segments for permitting interfitting together of the end plugs of adjacent fuel rod segments.

Further, the present invention is directed to a fuel assembly for use in a nuclear reactor core having an upper end region and a lower end region in each of which the average rate of axial fuel burnup is lower than in a middle region of the core located therebetween. The fuel assembly comprises: (a) a plurality of axially-extending fuel modules; and (b) means for releasably joining the fuel modules together in axially aligned end-to-end relation. The fuel modules include an upper end fuel module having an axial dimension corresponding substantially to that of the upper end region of the core, and a lower end module having an axial dimension corresponding substantially to that of the lower end region of the core. The fuel modules are axially stacked subassemblies, each of the subassemblies including a plurality of fuel rod segments. Each subassembly further includes a plurality of elongated structural segments and at least one support grid mounted to the structural segments and supporting the fuel rod segments.

Still further, the present invention is directed to a method of assembling and reassembling a fuel assembly, comprising the steps of: (a) assembling an initial set of axially modular subassemblies in a stacked relation such that respective pluralities of elongated structural segments and pluralities of fuel rod segments thereof are aligned end-to-end relation; (b) releasably interfitting the fuel rod segments of adjacent subassemblies to provide a plurality of fuel rods of the fuel assembly; and (c) releasably connecting the structural segments of adjacent subassemblies to provide a plurality of structural members of the fuel assembly. The method further comprises (d) releasing the fuel rod segments and structural segments of adjacent subassemblies from one another; (e) disassembling the subassemblies of the initial set thereof from the stacked relation; (f) substituting new subassemblies in place of some of the subassemblies of the initial set; and (g) reassembling the new subassemblies with the remaining initial subassemblies, such as the top and bottom subassemblies from previous burnt fuel assemblies.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
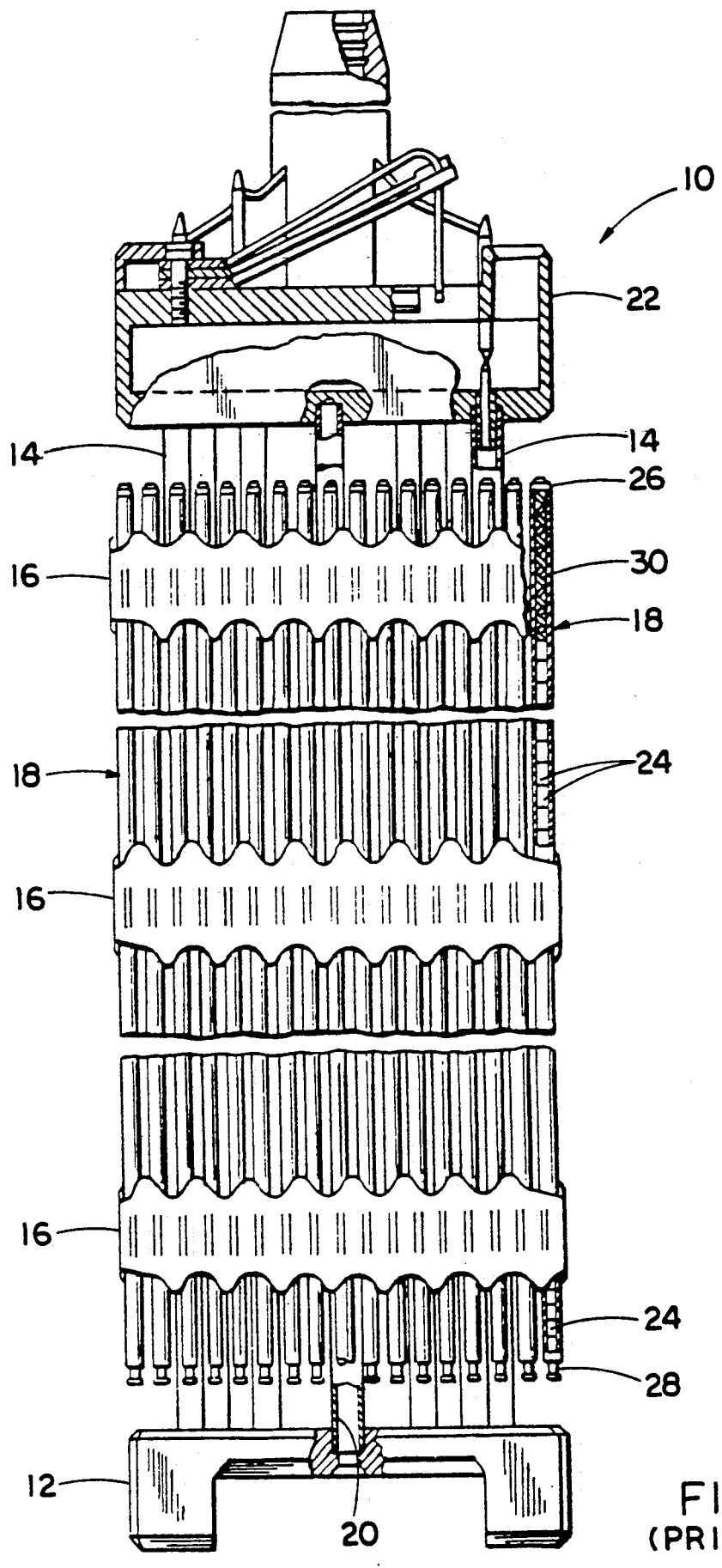
FIG. 1 is a side elevational view, with parts partially sectioned and broken away for purposes of clarity, of a prior art nuclear fuel assembly.
Figure 2:
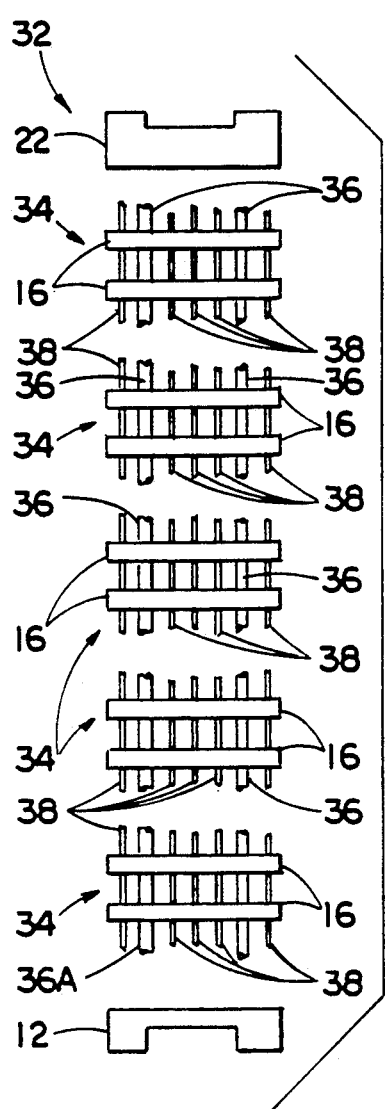
FIG. 2 is an exploded schematic representation of an axially modular fuel assembly in accordance with the present invention.
Figure 3:
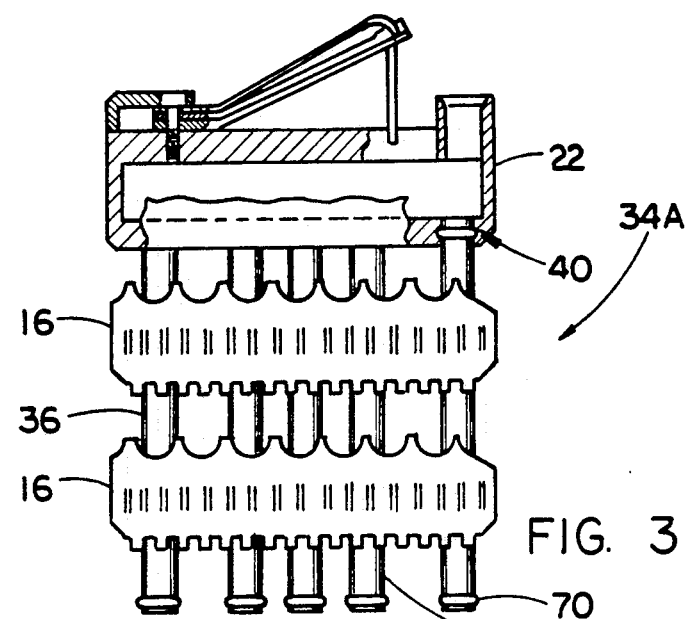
FIG. 3 is a side elevational view of an upper subassembly of the modular fuel assembly of FIG. 2 with the fuel rod segments of the subassembly being omitted.
Figure 4:
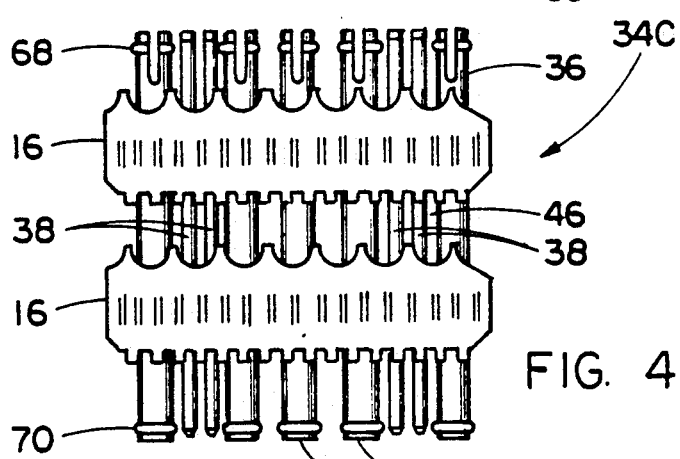
FIG. 4 is a side elevational view of an intermediate subassembly of the modular fuel assembly of FIG. 2 with the fuel rod segments of the subassembly being included.
Figure 5:
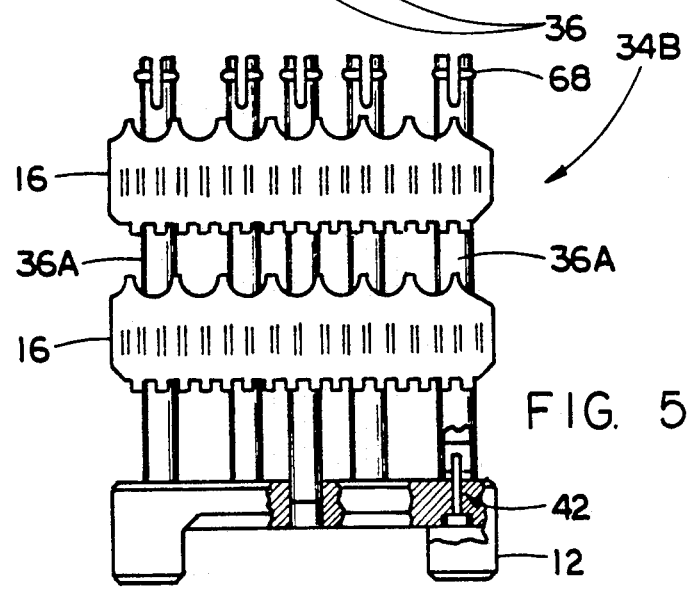
FIG. 5 is a side elevational view of a lower subassembly of the modular fuel assembly of FIG. 2 with the fuel rod segments of the subassembly being omitted.

Referring now to the drawings, and particularly to FIG. 1, there is shown a prior art nuclear reactor fuel assembly, being represented in vertically foreshortened form and generally designated by the numeral 10. Being of the type use in a pressurized water nuclear reactor (PWR), the fuel assembly 10 basically includes a lower end structure or bottom nozzle 12 for supporting the assembly on the lower core plate (not shown) of the PWR core (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14 to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26, 28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

Axially Modular Fuel Assembly and Rod of Invention

Referring now to FIGS. 2-5, there is illustrated an axially modular fuel assembly of the present invention, generally designated 32. Those parts of the modular fuel assembly 32 which are substantially the same as parts used in the prior art fuel assembly 10 are identified hereafter by the same reference numbers as earlier. The modular fuel assembly 32 basically includes a plurality or set of axially stacked or assembled subassemblies 34.

The set of subassemblies 34 include a top or upper subassembly 34A incorporating the prior art top nozzle 22, a bottom or lower subassembly 34B incorporating the prior art bottom nozzle 12, and a plurality of intermediate subassemblies 34C, preferably at least three in number, disposed between the upper and lower subassemblies 34A, 34B.

Figure 9:
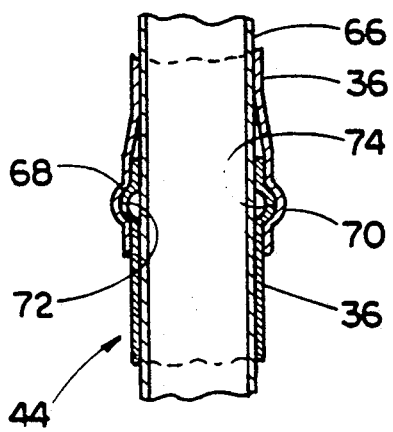
FIG. 9 is an enlarged fragmentary view of one releasable joint between adjacent guide thimble segments of FIG. 8.

Each subassembly 34 includes a plurality of elongated structural components in the form of guide thimble segments 36, a plurality of fuel rod segments 38 and at least one and preferably a pair of the prior art support grids 16. The support grids 16 are mounted to the guide thimble segments 36 and support the fuel rod segments 38 in any suitable manner, such as employed heretofore in the case of the grids 16 in the prior art fuel assembly 10 of FIG. 1. The guide thimble segments 36 of the upper and lower subassemblies 34A, 34B are releasably mounted to the respective top and bottom nozzles 22, 12 thereof in any suitable manner, such as employed heretofore in the case of the guide thimbles 14 in the prior art fuel assembly 10. For example as seen in FIG. 9, a socket and groove attachment arrangement 40 is employed at the top nozzle 22 and a threaded plug and screw attachment arrangement 42 is utilized at the bottom nozzle 12.

Figure 8:
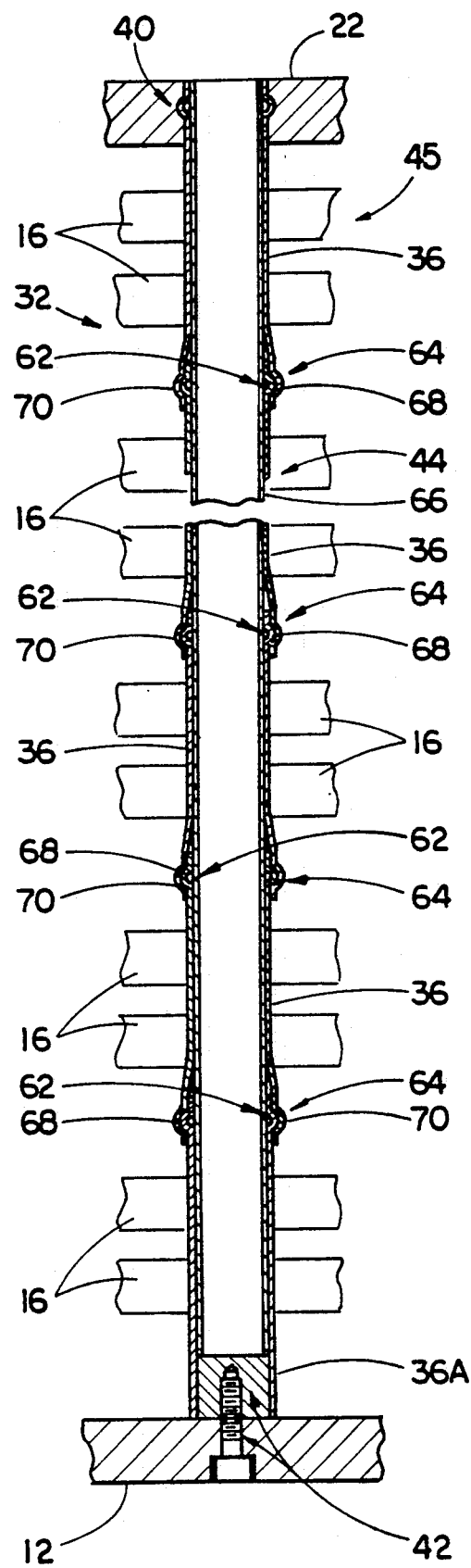
FIG. 8 is an enlarged fragmentary longitudinal sectional view, in axially foreshortened form, of the modular fuel assembly of FIG. 2, illustrating the releasable joints formed between one column of guide thimble segments of the subassemblies and an elongated lock tube fitted through the column of guide thimble segments.

The guide thimble segments 36 of the assembled subassemblies 34 are interlocked together for forming a plurality of elongated segmented guide thimbles 44 which extend between and are connected to the top and bottom nozzles 22, 12. The segmented guide thimbles 44 and top and bottom nozzles 22, 12 together define a structural skeleton 45 (only a portion of which is seen in FIG. 8) of the modular fuel assembly 32. The support grids 16 of the respective assembled subassemblies 34 are disposed in axially spaced relation relative to one another along the segmented guide thimbles 44. The fuel rod segments 38 of the respective adjacent assembled subassemblies 34 supported by the grids 16 are disposed in axially aligned end-to-end interfitted relation with each other to form a plurality of elongated modular fuel rods 46 of the modular fuel assembly 32.

Figure 6:
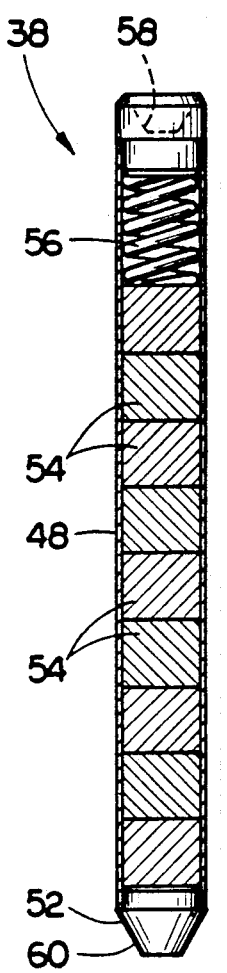
FIG. 6 is an enlarged longitudinal sectional view of one embodiment of a fuel rod segment utilized in the modular fuel assembly subassemblies of FIGS. 3-5.
Figure 7:
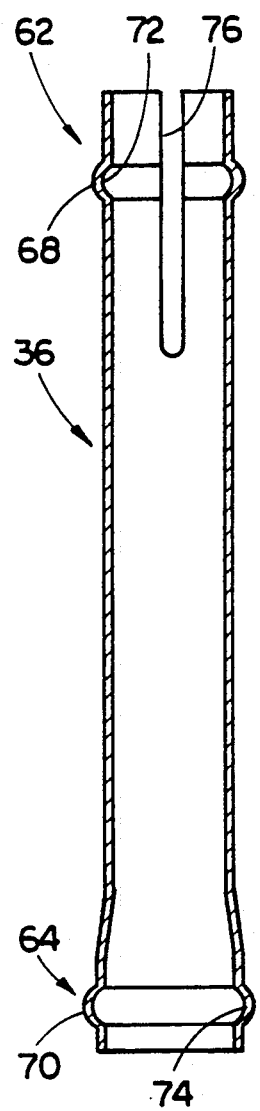
FIG. 7 is an enlarged guide thimble segment utilized in the modular fuel assembly subassemblies of FIGS. 3-5.

In the one embodiment of the modular fuel rod 46, each of the fuel rod segments 38 as seen in FIG. 6 includes a cladding tube segment 48, a pair of upper and lower end plugs 50, 52 fitted in and sealing opposite ends of the tube segment 48, a stack of fuel pellets 54 contained within the sealed tube segment 48 and a plenum spring 56 disposed between the fuel pellet stack 54 and the upper end plug 50. Also, as best seen in FIG. 6, the modular fuel assembly 32 includes means in the form of first and second interfitting elements 58, 60 are defined on respective opposite upper and lower end plugs 50, 52 for releasably joining together the axially end-to-end aligned fuel rod segments 38 of the assembled subassemblies 34 to form the array of segmented fuel rods 46 of the modular fuel assembly 32. The first and second elements 58, 60 can take any suitable form. In the example seen in FIG. 6, the first element 58 is an axially-extending recess formed on the upper end plug 50, whereas the second element 60 is an axially-extending projection formed on the lower end plug 52. The first and second elements 58, 60 are complementarily configured to interfit with one another.

Figure 10:
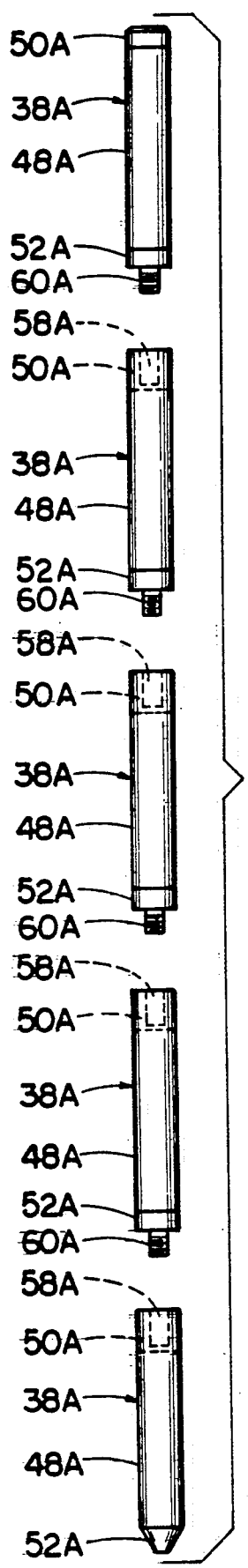
FIG. 10 is an exploded schematic representation of another embodiment of a modular nuclear fuel rod in accordance with the present invention.
Figure 11:
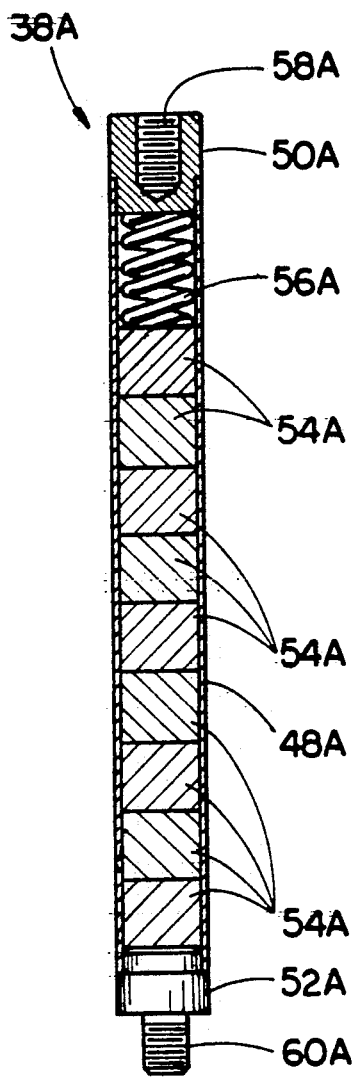
FIG. 11 is an enlarged longitudinal sectional view of one of the fuel rod segments of the fuel rod of FIG. 10.

In another embodiment of the modular fuel rod, designated as 48A, is shown in FIG. 10. The modular fuel rod 48A is composed of a plurality of axially aligned fuel rod segments 38A and means for releasably joining the fuel segments together in axially aligned end-to-end relation with each other. Similar to each fuel rod segment 38 of the embodiment of FIG. 6, each of the fuel rod segments 38A of the embodiment of FIG. 11 includes a cladding tube segment 48A, a pair of upper and lower end plugs 50A, 52A fitted in and sealing opposite ends of the tube segment 48A, a stack of fuel pellets 54A contained within the sealed tube segment, and a plenum spring 56A disposed between the fuel pellet stack 54A and the upper end plug 50A. In contrast to the embodiment of the fuel rod segment 38 of FIG. 6, the first and second elements 58A, 60A on the respective upper and lower end plugs 50A, 52A (except for the uppermost and bottommost end plugs) of the embodiment of the fuel rod segment 38A of FIG. 11 have complementarily configured male and female threaded elements respectively in the form of an internally-threaded bore 58A and an externally-threaded stud 60A. The axially-aligned fuel rod segments 38A of FIG. 10 can thus be threaded together in end-to-end relation to provide the modular fuel rod 46A.

Referring to FIGS. 5 and 7-9, the modular fuel assembly 32 further includes means for releasably interlocking the structural or guide thimble segments 36 together to form the plurality of elongated structural support members or segmented guide thimbles 44 extending between and connected to the top and bottom nozzles 22, 12. As mentioned earlier, the segmented guide thimbles 44 and top and bottom nozzles 22, 12 together define the structural skeleton 45 (only a portion of which is seen in FIG. 9) of the modular fuel assembly 32.

The interconnecting or interlocking means of the modular fuel assembly 32 includes first and second portions 62, 64 defined on opposite ends of structural guide thimble segments 36 and a plurality of elongated locking tubular members 66. By way of an example, the first and second portions 62, 64 can take the form of intermeshing circumferential upper and lower bulges 68, 70 defining grooves 72, 74. The first or upper portion 62 of each one of the first and second portions 62, 64 contains at least one and preferably several circumferentially-spaced and axially extending slots 76 which render the upper portion 62 expandable and contractible for permitting mating or interfitting and release of the first and second portions 62, 64 respectively with and from one another. Once all of the guide thimble segments 36 have been assembled by intermeshing of the bulges 68, 70 together, one locking member 66 is inserted through each assembled segmented guide thimble 44 for retaining the structural segments 36 thereof together in interfitted relation. The central one of the segmented guide thimbles 44 is adapted for receiving the components of the conventional instrumentation tube 20.

The modular nuclear fuel assembly 32 can be assembled in a stacked relation from an initial set of the axially modular subassemblies 34A-C by first placing the respective pluralities of structural guide thimble segments 36 and pluralities of fuel rod segments 38 thereof in end-to-end aligned relation. Next, the fuel rod segments 38 of adjacent stacked subassemblies 34 are releasably interfitted together by nesting of the projections 60 into the recesses 58 to provide the plurality of assembled segmented fuel rods of the modular fuel assembly 32. Finally, the structural guide thimble segments 36 of adjacent stacked subassemblies 34 are releasably interlocked together by interfitting and mating their bulges 68, 70 together to provide a plurality of assembled segmented structural guide thimbles 44 of the modular fuel assembly 32 and by inserting the tubular locking members 66 through the assembled guide thimbles 44.

After completion of an operating cycle of the reactor core, the fuel assembly 32 can be disassembled and then reassembled by substituting several new subassemblies with several of the subassemblies of the initial set. The fuel assembly 32 is preferably removed from the core and prepared for disassembly by withdrawing the locking members 66 from the assembled guide thimbles 44. Next, the respective fuel rod segments 38 and structural guide thimble segments 36 of adjacent subassemblies are released from one another and then the subassemblies are unstacked one at a time. After the new subassemblies are substituted in place of the selected old ones of the initial set, the new subassemblies and retained old subassemblies can be reassembled and installed in the reactor core by reversing the above-described assembling steps.

Figure 12:
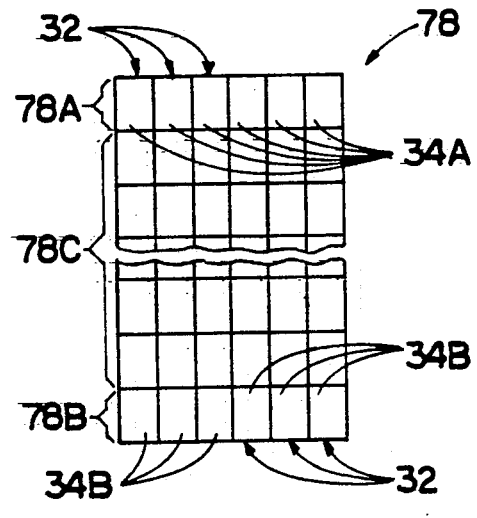
FIG. 12 is a schematic representation of a nuclear reactor core composed of the modular fuel assemblies of the present invention.

FIG. 12 is a schematic representation of a nuclear reactor core 78 composed of the modular fuel assemblies 32 of the present invention having the construction described earlier. The nuclear reactor core 78 has an upper end region 78A and a lower end region 78B in each of which the average rate of axial fuel burnup is lower than in a middle region 78C of the core which is located between the upper and lower end regions. In the modular fuel assemblies 32 of the core 78, the upper and lower subassemblies 34A, 34B and the respective fuel rod segments contained therein have respective axial dimensions corresponding substantially to the axial dimensions of the upper and lower end regions 78A, 78B of the core 78. Thus, the fuel in the upper and lower subassemblies 34A, 34B which is reclaimed for re-use by incorporation of the subassemblies 34A, 34B into the reassembled fuel assemblies corresponds to or matches in axial length the fuel in those regions of the core having the lower burn rate compared to the fuel in the middle region 78C of the core 78. Better fuel utilization thus results by re-using the upper and lower subassemblies 34A, 34B which contain the higher reactivity fuel.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof

We claim:

1. A modular fuel assembly, comprising:
   (a) a plurality of axially stacked end-to-end adjacent subassemblies;
   (b) each of said subassemblies including a plurality of elongated structural segments, a plurality of fuel rod segments and at least one support grid mounted to said structural segments and supporting said fuel rod segments; and
   (c) means defined on opposite ends of said structural segments for releasably connecting together in axially aligned end-to-end relation said structural segments of said respective adjacent subassemblies to form a plurality of elongated structural support members for providing a structural skeleton of said modular fuel assembly with said support grids of said respective adjacent subassemblies disposed in axially spaced relation relative to one another along said structural support members and said fuel rod segments of said respective adjacent subassemblies disposed in axially aligned end-to-end relation with each other.

2. The assembly as recited in claim 1 further comprising, means for releasably joining said fuel rod segments together to form a plurality of elongated fuel rods of said modular fuel assembly.

3. The assembly as recited in claim 1, wherein opposite end ones of said subassemblies includes top and bottom nozzles.

4. The assembly as recited in claim 3, wherein a plurality of intermediate ones of said subassemblies are disposed between said end subassemblies.

5. The assembly as recited in claim 3, wherein said structural segments of said end subassemblies are releasably mounted to said respective top and bottom nozzles thereof.

6. The assembly as recited in claim 3, wherein said intermediate subassemblies are at least three in number.

7. The assembly as recited in claim 1, wherein said connecting means includes first and second portions defined on said opposite ends of said structural segments for permitting interfitting together of said ends of adjacent structural segments forming each of said structural members of said modular fuel assembly.

8. The assembly as recited in claim 7, wherein said connecting means further includes a plurality of elongated locking members each being insertable through one of said structural members formed by said structural segments for retaining said structural segments interfitted together.

9. The assembly as recited in claim 8, wherein said first and second portions of said structural segments are intermeshing circumferential bulges defined in said opposite ends of said structural segments, one of said first and second portions being expandable and contractible for allowing release of said first and second portions from one another.

10. The assembly as recited in claim 1, wherein each of said fuel rod segments includes a tube segment, a pair of end plugs sealing opposite ends of said tube segment, and a stack of fuel pellets contained within said sealed tube segment.

11. The assembly as recited in claim 10, wherein said joining means includes first and second elements defined on said respective adjacent end plugs of said fuel rod segments for permitting interfitting together of said end plugs of adjacent fuel rod segments forming each of said fuel rods of said modular fuel assembly.

12. A modular fuel assembly, comprising:
   (a) an upper subassembly including a top nozzle;
   (b) a lower subassembly including a bottom nozzle;
   (c) a plurality of intermediate subassemblies;
   (d) each of said upper, lower and intermediate subassemblies including a plurality of elongated structural segments, a plurality of fuel rod segments and at least one support grid mounted to said structural segments and supporting said fuel rod segments, said structural segments of said upper and lower subassemblies being releasably mounted to said respective top and bottom nozzles thereof;
   (e) means defined on opposite ends of said structural segments for releasably interlocking together in axially aligned end-to-end relation said structural segments of said respective adjacent subassemblies to form a plurality of elongated structural support members extending between and connected to said top and bottom nozzles to define therewith a structural skeleton of said modular fuel assembly with said support grids of said respective adjacent subassemblies disposed in axially aligned end-to-end relation each other; and (f) means for releasably joining said fuel rod segments together to form a plurality of elongated fuel rods of said modular fuel assembly.

13. The assembly as recited in claim 12, wherein said intermediate subassembly are at least three in number.

14. The assembly as recited in claim 12, wherein said connecting means includes first and second portions defined on said opposite ends of said structural segments for permitting interfitting together of said ends of adjacent structural segments forming each of said structural members of said modular fuel assembly.

15. The assembly as recited in claim 14, wherein said connecting means further includes a plurality of elongated locking members each being insertable through one of said structural members formed by said structural segments for retaining said structural segments interfitted together.

16. The assembly as recited in claim 14, wherein said first and second portions of said structural segments are intermeshing circumferential grooves defined in said opposite ends of said structural segments, one of said first and second portions being expandable and contractible for allowing release of said first and second portions from one another.

17. The assembly as recited in claim 12, wherein each of said fuel rod segments includes a tube segment, a pair of end plugs sealing opposite ends of said tube segment, and a stack of fuel pellets contained within said sealed tube segment.

18. The assembly as recited in claim 17, wherein said joining means includes first and second elements defined on said respective adjacent end plugs of said fuel rod segments for permitting interfitting together of said end plugs of adjacent fuel rod segment forming each of said fuel rods of said modular fuel assembly.

19. The assembly as recited in claim 18, wherein said first element is an axially-extending recess formed on one of said fuel rod segment end plugs.

20. The assembly as recited in claim 19, wherein said second element is an axially-extending projection formed on the other of said fuel rod segment end plugs.

21. A method of assembling and reassembling a fuel assembly, comprising the steps of:

(a) assembling an initial set of axially modular subassemblies in a stacked relation such that respective pluralities of elongated structural segments and pluralities of fuel rod segments thereof are aligned end-to-end relation;

(b) releasably interfitting the fuel rod segments of adjacent subassemblies to provide a plurality of fuel rods of the fuel assembly; and (c) releasably connecting the structural segments of adjacent subassemblies to provide a plurality of structural members of the fuel assembly.

22. The method as recited in claim 21, wherein the initial set of subassemblies is composed a pair of upper and lower subassemblies having top and bottom nozzles respectively and a plurality of intermediate subassemblies not having nozzles.

23. The method as recited in claim 21, further comprising:

(d) releasing the fuel rod segments and structural segments of adjacent subassemblies from one another;

(e) disassembling the subassemblies of the initial set thereof from the stacked relation;

(f) substituting new subassemblies in place of some of the subassemblies of the initial set; and (g) reassembling the new subassemblies with the remaining initial subassemblies.

24. The method as recited in claim 23, wherein said remaining initial subassemblies are said upper and lower subassemblies from a previous burnt fuel assembly.

* * * * *